Patented Oct. 8, 1929

1,730,485

UNITED STATES PATENT OFFICE

MERWYN C. TEAGUE, OF JACKSON HEIGHTS, NEW YORK, ASSIGNOR TO THE NAUGATUCK CHEMICAL COMPANY, OF NAUGATUCK, CONNECTICUT, A CORPORATION OF CONNECTICUT

METHOD OF MAKING RUBBER COMPOSITIONS

No Drawing. Application filed March 31, 1925. Serial No. 19,735.

This invention relates to a new and improved method of dispersing compounding ingredients.

Various means have hitherto been employed for treating pulverulent materials in order to facilitate their incorporation with or dispersion in rubber. One of these means is to keep the materials in a substantially dry condition. Another means has been to reduce the particles of the materials to a fine state of subdivision. Yet another means is to add the materials to the rubber, after first forming a suspension of the material in a liquid carrier and, after incorporation with the rubber, removing the liquid carrier. Another method of preparing pulverulent materials is to subject them to a calcination treatment for the purpose of cleaning, degassing, and activating the surface of the material. It has also been proposed to peptize pulverulent materials by treatment with a suitable liquid. Such treatment however necessitates a subsequent drying of the material and a pulverizing step. It is known furthermore that various pulverulent materials adsorb gases in a selective manner and when used with rubber, bring into the rubber gases some of which are easily soluble in the rubber while others are adsorbed thereby. If the gases are soluble in rubber, they aid in bonding the rubber with the pulverulent material. If they are adsorbed or are but slightly soluble in the rubber, they act as a protective sheath on the particles of the material preventing the formation of the most efficient bonding, and frequently causing actual porosity of the rubber mixture.

With the preferred embodiment in mind, and without intention to limit its scope further than is required by the prior art, this invention, briefly stated, is concerned with a method of treating materials to increase their dispersion in rubber. Another object of the invention is to furnish a method for accomplishing peptization, whereby the peptizing agent is administered in gaseous form. Another object of the invention is to provide a means of controlling the gaseous content of pulverulent materials. A still further object is the preparation of rubber compositions in which the pulverulent materials have been peptized with a gas which is soluble in rubber and at the same time is readily adsorbed by the pulverulent materials.

In the preferred process the pulverulent materials are treated with gaseous ammonia. The pulverulent material is placed in a vessel which has means connected thereto for evacuating the gases in the vessel, means for closing the vacuum arrangement, and also means for introducing another gas. This can be done suitably with a two-way valve. The vessel containing the compounding ingredient is gradually evacuated and the temperature of the vessel is gradually increased to say 300° or 400° F. and held at this temperature while still under vacuum for a suitable length of time to withdraw any air or gases which may be adsorbed on the particles of the pulverulent material. From 30 minutes to 1 hour is usually sufficient. After all the air or other gases have been withdrawn from the vessel and the pulverulent material therein, the vacuum line is closed and dry ammonia gas is gradually introduced until atmospheric pressure is attained within the vessel. The pulverulent material is then allowed to remain in the atmosphere of ammonia for about 1 hour after which it is removed and may be added directly to rubber in the usual way or may be placed in a warm storage box for future use. It is sometimes preferable to use the warm storage box in order to allow some of the excess of ammonia to escape from the pulverulent material so that its future use is not irksome to the operator. The pulverulent material thus treated is then utilized in the ordinary ways of mixing and curing if it is to be employed as a compounding material.

Where pulverulent materials such as clays, carbon blacks, lamp blacks and the like are used it is desirable to have a small amount of moisture present whereby the gas is able to function as a peptizing agent to produce smaller particles of the pulverulent materials and to disperse agglomerates of the material. An example of such a process is as follows:—Ordinary clay is evacuated in the vessel and then treated with ammonia, the temperature in this case being only 220° F. which is not sufficient to remove all of the moisture which is present in the clay. The small amount of moisture present, together with the dry ammonia which is led into the vessel, serves to peptize the clay.

As an example of the beneficial effect of such treatment when the material is used as a rubber compounding ingredient the addition of 20 cu. cms. of treated clay to 100 grams of pale crepe containing 10 grams of sulphur and vulcanized for 165 minutes at 286° F. shows an improvement of approximately 12% in tensile strength over the untreated clay. Photo micrographs of the resulting rubber compounds show clearly that the treated clay has a higher degree of dispersion in the rubber and shows a lesser number of aggregates than the untreated clay.

Lamp black was similarly treated, reaching a temperature in this case of 330° F. In this example the sequence of treatment was changed, the heating step being applied first and followed by the evacuation step. Ammonia gas was introduced while the lamp black was cooling. A comparison of the treated black with the untreated in a formula similar to that used for the clay comparison the improvement in tensile strength was about 8% and the improvement in the abrasion resistance was 12 to 14%.

Similar increases in tensile strength are obtained with other pulverulent materials such as alba whiting.

It is possible to employ other gases in this treatment as for example carbon dioxide, methane and ethylene. These gases however are not alkaline in nature and do not therefore serve as peptizing agents. They are however adsorbed by the pulverulent material and are at the same time relatively soluble in rubber. Their action when adsorbed to the pulverulent material is that, when the ingredient is added to rubber, the latter draws the gas from the pulverulent material into solution in the rubber, thereby destroying any function of the adsorbed gas to hold the particles of pulverulent material away from intimate union with the rubber. The adsorbed gas acts in a manner which resembles an actual cementing of the rubber and the particles. It is seen here that the bonding of pulverulent materials with rubber is not necessarily connected with the property of such gases to function as peptizing agents.

It is of course possible to vary the conditions of treatment enumerated above, particularly those of temperature, during the treatment of the pulverulent materials, the degree of heat employed being dependent upon the nature and sensitiveness of the material under consideration.

Having thus described my invention, what I claim and desire to protect by Letters Patent is:

1. A method of peptizing pulverulent materials, which comprises, evacuating said materials, heating same and subjecting said materials to the action of ammonia gas in the presence of moisture whereby the ammonia is adsorbed and the pulverulent material peptized.

2. A method of improving the union between rubber and pulverulent materials, which comprises evacuating said materials, treating same with ammonia gas in the presence of moisture, said gas being adsorbed on, and peptizing said materials, and combining said treated materials with rubber whereby the pulverulent material containing ammonia is finely dispersed in the rubber.

Signed at New York, county and State of New York, this 23d day of March, 1925.

MERWYN C. TEAGUE.